United States Patent Office 2,746,948
Patented May 22, 1956

2,746,948

CRYSTALLINE COMPLEXES OF SULFUR COMPOUNDS WITH UREA

Lloyd C. Fetterly, Seattle, Wash., assignor to Shell Development Company, San Francisco, Calif., a corporation of Delaware No Drawing. Application February 16, 1948,
Serial No. 8,749

8 Claims. (Cl. 260—96.5)

This invention is concerned with novel complexes of urea and certain classes of organic compounds. More particularly, it is directed to the formation of such novel complexes and to the use of this discovery for the fractionation of mixtures containing polar organic materials as described hereinafter.

The fractionation of mixtures of organic substances is usually effected by variations of well known processes such as fractional distillation, selective adsorption, fractional crystallization and extractive distillation. Such methods are adequate for many purposes. For example, the fractionation of petroleum products by distillation procedures is usually sufficient, since in most instances the boiling range of the fractions taken is their most important physical characteristic. However, for numerous purposes the fractionation of mixtures of organic compounds containing a variety of structural configurations or chemical substituents cannot be performed by the above mentioned methods. If, for example, such mixtures contain substantially unbranched organic compounds together with waxy paraffins, naphthenes, and aromatics, ordinary distillation results only in separation according to boiling point and not according to structural configuration.

A recent method has been devised for the separation of mixtures according to structural types. It was found that urea formed crystalline complexes with hydrocarbons and oxygen containing organic compounds such as acids, esters, ketones and aldehydes, which had a substantially unbranched configuration. A further discovery was made that urea formed a complex with 2,6-lutidine but this is the single exception to the above work.

One of the limitations of this new process was the fact that urea complexes could not be formed with hydrocarbons having less than 6 carbon atoms. Furthermore, the influence of substituents other than carbon, hydrogen and oxygen was unknown except for the single instance of the complex formation of urea with 2,6-lutidine. This placed a definite limitation on the utilization of the process since many mixtures of organic compounds contained members not investigated in this regard.

It is an object of this invention to provide a method of fractionation of new mixtures of organic compounds by the use of complex formation with urea. It is another object of this invention to form novel complexes between urea and certain types of organic materials as more clearly specified hereinafter. Other objects will become apparent during the following discussion.

Now, in accordance with this invention, it has been found that urea forms crystalline complexes with certain types of organic compounds, namely, halogen containing compounds, and sulfur containing compounds.

Still in accordance with this invention, it has been found that such crystalline complex formations may be utilized for the fractionation of mixtures of polar organic materials and for the separation of the above types of active compounds from their mixtures with other polar substances, the latter being substantially inert toward urea under the reaction conditions employed.

Again in accordance with this invention, the process of the present invention can be employed for the fractionation of mixtures containing polar organic materials normally inert toward urea. Such utilization comprises treating said mixture to form halogen or sulfur containing compounds and subsequently contacting the treated mixture with urea in order to form crystalline complexes between the latter and at least a portion of the materials converted as described during the preliminary treatment.

Those familiar with the earlier work concerning urea complexes are aware of the fact that some materials form complexes with urea with extreme ease and under a variety of operating conditions. Obviously this state of affairs is preferred. However, complexes may be formed between other more reluctant organic compounds and urea if special conditions are employed. The presence of halogen or sulfur makes complex formation possible with substituted hydrocarbons having as little as one carbon atom, whereas unsubstituted hydrocarbons having less than six carbon atoms do not form complexes.

Another type of compound found to form complexes with urea includes organic compounds containing at least one sulfur atom. Of these, the heterocyclic compounds containing sulfur in the heterocyclic ring form such complexes with particular ease, and therefore, are a preferred class for use in the present invention.

Typical members of this heterocyclic group include thiophene and its analogs, homologs and derivatives such as alpha-thiophene alcohol, alpha-thiophene aldehyde, and the thiophene carboxylic acids, mono-nitro and dinitro-thiophenes, thiophene, beta-ethylthiophene, alpha-methylthiophene, alpha-thienylethylketone, alpha-iodothiophene, tetrahydrothiophenedicarboxylic acid, alpha, alpha-diphenylthiophene, 3,4-dihydroxythiophene, 2,5-dimethylthiophene, iodonitrothiophene, 2-thiophene, and beta-isopropylthiophene.

Another group of sulfur compounds found to form complexes with urea readily include the organic sulfides, especially the aliphatic sulfides including dimethyl sulfide, diethyl sulfide, dipropyl sulfide, dibutyl sulfide, diamyl sulfide, dihexyl sulfide, and mixed aliphatic sulfides such as methylethyl sulfide, ethylpropyl sulfide, methylbutyl sulfide, as well as their homologs, analogs and derivatives.

Other sulfides forming crystalline complexes with urea are dichlorodiethyl sulfide, divinyl sulfide, diphenyl sulfide, diallyl sulfide, dichlorodipropyl sulfide, diphenylene sulfide, dicyanodiethyl sulfide, etc.

Polysulfides also form crystalline complexes with urea, and of these the disulfides appear to form complexes with the most ease. Typical species of the class are the dialkyl disulfides such as dimethyl disulfide, diethyl disulfide, dipropyl disulfide, dibutyl disulfide, etc. Other suitable polysulfides are dichlorodiethyl disulfide, triphenylmethyl disulfide meta-dinitrodiphenyl disulfide, dibenzyl disulfide and higher polysulfides such as trimethylene trisulfide, diethylpentasulfide and triethylene tetrosulfide.

Other types of sulfur compounds which form crystalline complexes with urea include mercaptans, such as butyl mercaptans, the sulfoxides such as diphenylsulfoxide, the sulfones such as butadiene sulfone, the thioaldehydes such as alpha-thioacetaldehyde, the thioketones, such as thioacetone, the thioacids such as thiobutyric acid and their homologs, analogs and derivatives.

Organic compounds containing at least one halogen atom likewise form complexes with urea. Those forming complexes most readily have the general configuration

R—X wherein X is a halogen atom and R is a hydrocarbyl group. Preferably X is a chlorine atom, but it may be a bromine, iodine or fluorine atom instead.

Aliphatic halides forming such complexes include mono-substituted substances such as methyl chloride, ethyl choride, n-propyl chloride, isopropyl chloride, n-butyl chloride, n-butyl bromide, n-amyl bromide, n-hexyl iodide, as well as the higher homologs and analogs. The aryl halides also form crystalline complexes with urea. Typical members of this class are benzyl chloride, p-dibromobenzene, trichlorobenzene, chlorobromobenzenes, etc.

Polyhalogen aliphatic compounds forming complexes with urea include among others chloroform, bromoform, methylene chloride, ethylene chloride, ethylidene chloride, carbon tetrachloride, propylene iodide, 1,3-dibromopropane, methyl chloroform and trichlorethylene.

The process in which the present invention is employed inherently involves the following general features: Contacting, whereby the urea and the organic compounds are brought together; complex formation, wherein the complexes separate from the other components of the reaction mixture in crystal form; separation, wherein the crystalline complexes are removed from the other ingredients of the reaction mixture; and if desired, regeneration, whereby urea is regenerated in its original state from the organic compound with which it is combined in the complex.

Contact of the agent and the organic compounds may be conducted with or without the presence of an inert diluent for the latter component. Diluents which may be used include water, alcohol, inert hydrocarbons and polar compounds such as methyl ethyl ketone and methyl isobutyl ketone. The use of diluents is desirable where the organic compound to be treated is a solid or is a viscous liquid difficult to handle at the reaction temperature. A solvent for the urea may be present if desired. Suitable solvents for the agent include water, liquid sulfur dioxide and alcohols. However, the agent may be employed in solid form which is contacted with the organic compounds, the latter then being in either gaseous or liquid state. It is preferred that an excess of the agent be present at all times in order to promote maximum complex formation. Additional agent may be added at any time during the formation process. Temperatures from about —30° to about 100° C. are preferred and the most suitable range of temperatures includes 10 to 50° C. Hence, it will be seen that it is possible to operate the process at ordinary room temperatures.

The complexes formed by the process of the present invention are well defined crystalline substances usually containing about one molecule of urea for every carbon atom of the organic compound with which it is combined in complex structure. The complexes are for the most part substantially insoluble in the usual organic solvents and in water. The exact molecular configuration of these complexes has not been determined, although X-ray patterns indicate that the complex depends upon hydrogen bonding.

Following formation of a mixture of complexes, steps may be taken, if desired, to free the agent from its complex and simultaneously recover the organic compounds combined therewith. The complexes are conveniently decomposed without detriment to their component parts by heating in the presence of a solvent for the urea such as water, by heating in the presence of a solvent for the organic compound, by steam distillation or dry distillation as well as by other similar means.

As pointed out hereinbefore, advantage may be taken of the principles upon which this invention is based during the decomposition period. Since the temperature may be adjusted to a point whereat some complexes cannot exist while others are unaffected the decomposition temperature may be adjusted so as to decompose a portion of the complexes while leaving the others in their complex form.

As indicated in a part of the statement of this invention, one phase thereof comprises the treatment of mixtures of polar organic materials to form halogenated or sulfur containing, derivatives thereof and subsequently treating the converted mixture with urea in order to form crystalline complexes following which the usual fractionation steps as outlined above may be taken. For example, mixtures of hydrocarbons containing gaseous members, branched hydrocarbons, etc. may be chlorinated by treatment with chlorine under pressure at a tempreature of 50–175° C. Under other circumstances isoolefins may be converted into amines by treatment with ammonia following which the amines so prepared may be fractionated by formation of urea complexes. Many organic materials form sulfur containing derivatives by treatment with well known sulfurized agents such as sulfur, hydrogen sulfide, phosphorus sulfide or thionyl chloride. Many variations of these conversion processes are possible and well known in the art.

The present invention is subject to the control of many variables. Most important among these are the temperature of reaction, concentration of urea in its solvent, the identity of the urea solvent, the pH of the reaction mixture and the concentration of complex forming organic materials in their mixture. Generally it has been found that the most rapid complex formation occurs at the lowest operating temperatures. However, particularly in the case of halogenated hydrocarbons, complex formation is so rapid at room temperature that cooling is usually unnecessary.

The concentration of urea in its solvent is determined by the type of reaction desired. For example, if the maximum recovery of all of the complex forming agents in the mixture is the object in view, the urea solution should be employed at or near the saturation point. As the solution becomes depleted with respect to urea the temperature of reaction mixture should be lowered in order to maintain saturation.

As inferred hereinbefore, the urea solvent has an important function in determining the course of the reaction. Dependent upon the solubility characteristics of the mixture of organic compounds being treated the urea solvent may be modified or adjusted to allow more or less of said mixture to dissolve therein. Solvents such as water and alcohol, as well as mixtures thereof, are particularly desirable. Aqueous solutions of urea decompose to a limited extent and allow the formation of basic substances such as ammonia.

If the pH of the system is allowed to rise above about 9.5 the rate of formation of crystalline urea complexes is seriously retarded and is often completely stopped. Therefore, steps must be taken to maintain a pH below about 9.5 and preferably between about 3 and about 8.

The concentration of active complex forming organic substances in mixtures thereof is another factor determining the course and extent of complex formation. Highly dilute solutions of complex forming materials are undesirable since unduly low temperatures must be employed in order to cause adequate complex formation. One means of avoiding this situation when the inert diluent is aromatic in nature is to employ a medium such as liquid sulfur dioxide or phenol as the urea solvent. In this particular case it has been found that the aromatic constituents dissolve in the sulfur dioxide or phenol and thereby cause concentration of the complex forming materials.

The following examples are illustrative of the operation of the present invention.

*Example 1*

A saturated aqueous solution of urea was rapidly shaken with each of the following organic materials at a temperature of 25° C. In each case crystalline complexes formed within several minutes. Then these complexes are separated by means of filtration and subsequently heated to a temperature of about 95° C. In the presence of water they decompose, the urea thus regenerated dissolving in the water and the regenerated organic material forming a separate layer therefrom.

Halogenated organic compounds:
  Hexadecyl bromide
  n-Propyl iodide
  Iodobenzene
  Chloroform
  Trimethylene bromide
  Tetrachloroethylene
  Methyl chloroform
  Ethylidene chloride
Sulfur containing organic compounds:
  Thiophene
  Di-n-butyl disulfide
  Di-n-heptyl monosulfide
  n-Heptyl mercaptan In my application Serial No. 782,449, filed October 27, 1947, issued as Patent No. 2,569,984 on October 2, 1951, I have disclosed that urea will form complexes with the following halogenated organic compounds: hexadecyl bromide (identified in said patent as cetyl bromide), n-propyl iodide, chloroform, trimethylene bromide, tetrachloroethylene, methylchloroform, ethylidene chloride and iodobenzene. I have also disclosed in said patent that urea will form complexes with the following sulfur containing organic compounds: heptyl mercaptan and thiophene.

I claim as my invention:

1. A crystalline complex of urea and an organic sulfur compound of the group consisting of thiophene, straight chain alkyl mercaptans, straight chain dialkyl monosulfides and straight chain dialkyl disulfides, said mercaptans, monosulfides and disulfides having at least six carbon atoms per molecule.

2. A crystalline complex of urea and a straight-chain alkyl mercaptan having at least six carbon atoms in the molecule.

3. A crystalline complex of urea and a straight-chain dialkyl monosulfide having at least six carbon atoms in the molecule.

4. A crystalline complex of urea and a straight-chain dialkyl disulfide having at least six carbon atoms in the molecule.

5. As a new composition of matter, a crystalline complex of urea with thiophene.

6. As a new composition of matter, a crystalline complex of urea with di-n-heptyl monosulfide.

7. As a new composition of matter, a crystalline complex of urea and n-heptyl mercaptan.

8. As a new composition of matter, a crystalline complex of urea and di-n-butyl disulfide.

References Cited in the file of this patent

UNITED STATES PATENTS

| | | |
|---|---|---|
| 1,830,859 | Schotte | Nov. 10, 1931 |
| 2,297,034 | Stryzyzewski | Sept. 29, 1942 |
| 2,376,008 | Riethof | May 15, 1945 |
| 2,642,423 | Gorin | June 16, 1953 |

OTHER REFERENCES

Technical Oil Mission Reel 143, translated by Shell, frames 135 to 139.

Goldschmidt: Zeitschrift für Elektrochemie 22, 346 (1916).

McCasland: J. Am. Chem. Soc. 68, 533 (1946).

Bengen et al.: "Experimentia," vol. 5, page 200 (1949).

Zimmerschied et al.: "Industrial and Eng. Chemistry," vol. 42, pages 1300 to 1306 (1950).